(12) United States Patent
Kito (10) Patent No.: US 6,900,825 B2
(45) Date of Patent: May 31, 2005

(54) PRINTER AND PROJECTOR EQUIPPED WITH MICROMIRROR DEVICE

(75) Inventor: Eiichi Kito, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 951 days.

(21) Appl. No.: 09/741,022

(22) Filed: Dec. 21, 2000

(65) Prior Publication Data

US 2002/0051141 A1 May 2, 2002

(30) Foreign Application Priority Data

Dec. 24, 1999 (JP) .......................................... 11-366285

(51) Int. Cl.⁷ ................................................ B41J 2/47
(52) U.S. Cl. ..................................... 347/239; 347/255
(58) Field of Search ................................. 347/239, 255, 347/224, 241, 256; 355/39–44, 68; 345/108; 348/755; 359/201

(56) References Cited

U.S. PATENT DOCUMENTS

| | | | | |
|---|---|---|---|---|
| 5,636,001 A | * | 6/1997 | Collier | 355/41 |
| 5,696,616 A | * | 12/1997 | Wagensonner | 359/201 |
| 5,912,757 A | | 6/1999 | Suzuki et al. | 359/223 |
| 5,933,183 A | | 8/1999 | Enomoto et al. | 347/241 |
| 5,982,407 A | | 11/1999 | Enomoto et al. | 347/239 |

FOREIGN PATENT DOCUMENTS

JP          6-7247         1/1994    ........... G03B/27/32

* cited by examiner

*Primary Examiner*—Hai Pham
(74) *Attorney, Agent, or Firm*—Sughrue Mion, PLLC (57) ABSTRACT

A printer includes an image area sensor for picking up a picture frame in photo film to output image data. A printing projecting lens focuses and records a print frame to color photographic paper. Three LED light sources generate light. A digital micromirror device (DMD) is disposed in a traveling path of the light, includes plural micromirrors arranged in at least one array. The plural micromirrors are individually shiftable between first and second positions different in a direction, and when in the first position, direct the light to the photo film by reflection, and when in the second position, direct the light to the printing projecting lens by reflection. A controller initially sets the plural micromirrors in the first position, to illuminate the picture frame in the photo film while the image area sensor is operated. According to the image data, the controller sets micromirrors in one first group in the DMD to the first position, and sets micromirrors in a second group in the DMD to the second position except for the first group, to modulate the light by reflection on the second group. Thus, the print frame is printed with the printing projecting lens.

11 Claims, 7 Drawing Sheets

PRINTER AND PROJECTOR EQUIPPED WITH MICROMIRROR DEVICE

BACKGROUND OF THE INVENTION

1. Field of the Invention

The present invention relates to a printer and projector equipped with a micromirror device. More particularly, the present invention relates to a printer and projector which is equipped with a micromirror device, can have a small size and can operate at high speed.

2. Description Related to the Prior Art

An example of printer is a color photographic printer, which prints an image to photographic paper as photosensitive material, the image being obtained from negative photo film. Examples of the printer includes an analog printing type and digital printing type. In the analog printing type, light transmitted through the photo film is directly projected to the photographic paper. The digital printing type utilizes a cathode ray tube (CRT), laser, liquid crystal or the like. In the printer with the laser or liquid crystal, there is a spatial light modulator, which modulates three-color light emitted from a light source to adjust intensity, or deflects the three-color light.

A known example of the spatial light modulator is a mirror type, which includes a great number of micromirrors in an extremely small size, and in which spot light is deflected by controlling an inclination of the micromirrors. The spatial light modulator of the mirror type has an advantage in that its factor of attenuation of light is low and its aperture efficiency is high. Examples of the spatial light modulator of the mirror type are a digital micromirror device (DMD) and a piezoelectric driving type of micromirror device (AMA). The digital micromirror device (DMD) has the micromirrors which are tilted by electrostatic force and deflect light from the light source. The piezoelectric driving type of micromirror device (AMA) has the micromirrors which are tilted by piezoelectric elements of a small size. Also, U.S. Pat. No. 5,982,407 (corresponding to JP-A 09-164727) discloses the printer equipped with the digital micromirror device (DMD) as the spatial light modulator.

However, the printer according to the document has a shortcoming in its inevitably great size, because the printer includes a scanner section for reading an image and a paper exposure section, separate from the scanner section, for exposing the image to the photographic paper. There is a suggestion in JP-B 06-007247 disclosing the printer in which the scanner section and paper exposure section are unified. However, the light source for the paper exposure section to record to the photographic paper is individual from the light source for the scanner section. The printer is difficult to have a small size, as the necessity of the two light sources is inconsistent to reducing the size of the printer.

SUMMARY OF THE INVENTION

In view of the foregoing problems, an object of the present invention is to provide a printer and projector which is equipped with a micromirror device, can have a size reduced by a structural improvement, and can operate at high speed.

In order to achieve the above and other objects and advantages of this invention, a printer includes a pick-up section for picking up a picture image in photo film to output image data. A printing projecting optical system focuses and records a print image to photosensitive material. At least one light source generates light. A spatial light modulator is disposed in a traveling path of the light, includes plural micromirrors arranged in at least one array. The plural micromirrors are individually shiftable between first and second positions different in a direction, and when in the first position, direct the light to the photo film by reflection, and when in the second position, direct the light to the printing projecting optical system by reflection. A controller controls the pick-up section and the spatial light modulator, initially sets the plural micromirrors in the first position, to illuminate the picture image in the photo film while the pick-up section is operated, and according to the image data, sets micromirrors in one first group in the spatial light modulator to the first position, and sets micromirrors in a second group in the spatial light modulator to the second position except for the first group, to modulate the light by reflection on the second group, for recording of the print image with the printing projecting optical system.

Furthermore, a pick-up optical system focuses the light on the pick-up section upon being passed through the picture image in the photo film.

The pick-up section includes an image area sensor, the at least one array is plural arrays, and the plural micromirrors are disposed in a matrix form corresponding to a frame shape.

Furthermore, a photo film feeder is actuated after operation of the pick-up section, for feeding the photo film by one frame of the picture image. A photosensitive material feeder is actuated after recording of the printing projecting optical system, for feeding the photosensitive material by one frame of the print image.

In a preferred embodiment, the controller drives the photosensitive material feeder during operation of the pick-up section, and drives the photo film feeder during recording with the printing projecting optical system.

The controller controls the at least one light source during operation of the pick-up section in a different condition than during recording with the printing projecting optical system.

The photosensitive material is color photographic paper. The at least one light source is first, second and third light sources, driven selectively, for generating respectively red, green and blue light, to expose the photosensitive material.

The controller controls the first, second and third light sources in conditions different therebetween.

According to another aspect of the invention, a printer includes a printing projecting optical system for focusing and recording a print image to photosensitive material according to image data. There is an externally observable indicator screen. An indicating projecting optical system projects a simulated image on the indicator screen. At least one light source generates light. A spatial light modulator is disposed in a traveling path of the light, includes plural micromirrors arranged in a matrix form, wherein the plural micromirrors are individually shiftable between first and second positions different in a direction, and when in the first position, direct the light to the indicating projecting optical system by reflection, and when in the second position, direct the light to the printing projecting optical system by reflection. A controller controls the spatial light modulator, and according to the image data, sets micromirrors in one first group in the spatial light modulator to the first position, sets micromirrors in a second group in the spatial light modulator to the second position except for the first group, to modulate the light by reflection on the first group, for indication of the simulated image with the indicating projecting optical system, and also according to the image data, sets micromirrors in one third group in the spatial light modulator to the first position, and sets micromirrors in a fourth group in the spatial light modulator to the second position except for the third group, to modulate the light by reflection on the fourth group, for recording of the print image with the printing projecting optical system.

The indicator screen includes a screen plate through which at least part of light incident thereon is transmissible, and which has a screen inner face and a screen outer face, and the indicating projecting optical system projects the simulated image in an inverted form to the screen inner face.

According to still another aspect of the invention, a projector includes a pick-up section for picking up a picture image in photo film to output image data. A projecting optical system focuses a projected image on a projecting position. At least one light source generates light. A spatial light modulator is disposed in a traveling path of the light, includes plural micromirrors arranged in a matrix form, wherein the plural micromirrors are individually shiftable between first and second positions different in a direction, and when in the first position, direct the light to the photo film by reflection, and when in the second position, direct the light to the projecting optical system by reflection. A controller controls the pick-up section and the spatial light modulator, initially sets the plural micromirrors in the first position, to illuminate the picture image in the photo film while the pick-up section is operated, and according to the image data, sets micromirrors in one first group in the spatial light modulator to the first position, sets micromirrors in a second group in the spatial light modulator to the second position except for the first group, to modulate the light by reflection on the second group, for projection of the projected image with the projecting optical system.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENT(S) OF THE PRESENT INVENTION

Figure 1:
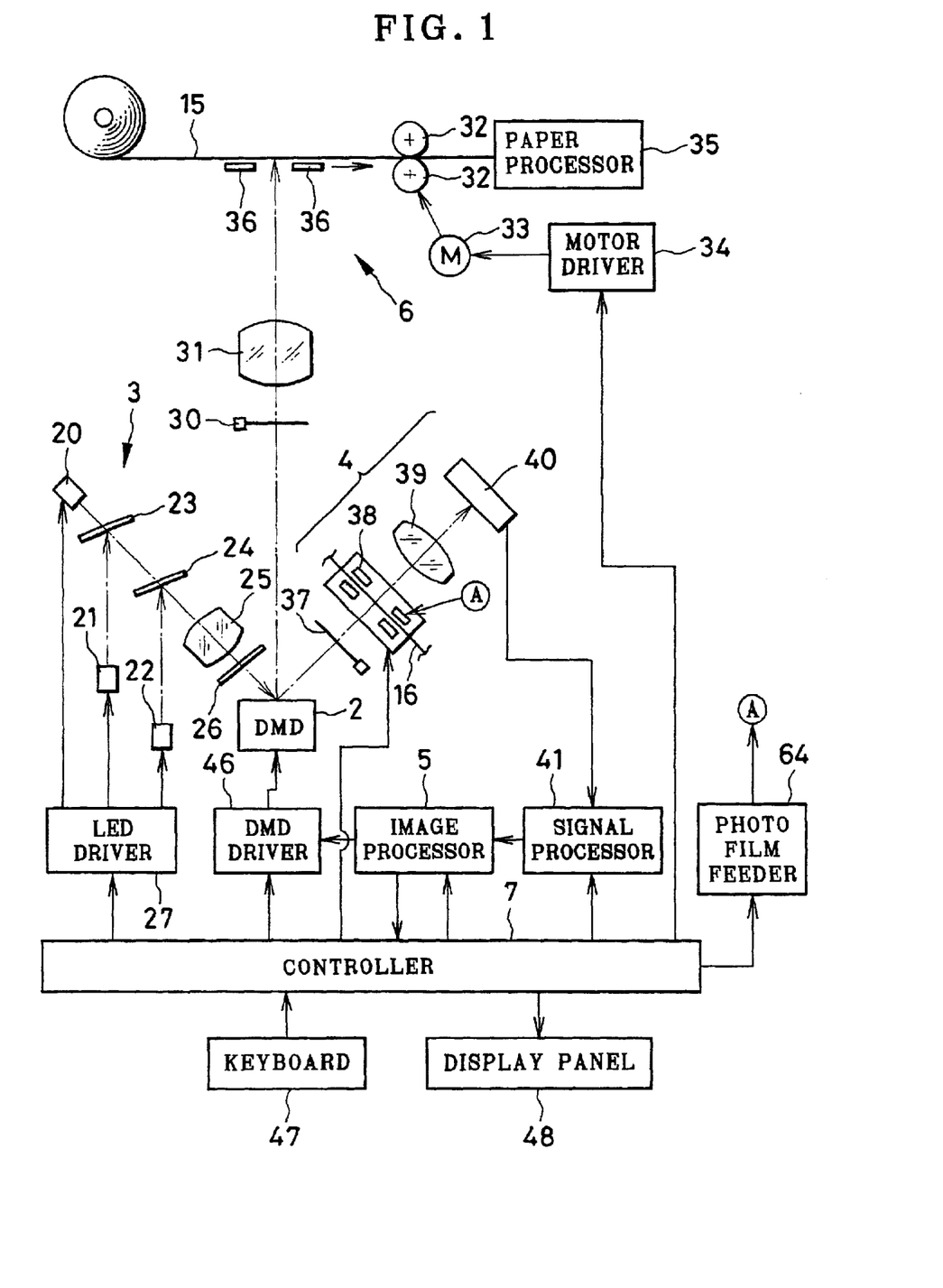
FIG. 1 is a block diagram schematically illustrating a color printer of the invention.

In FIG. 1, a printer of the present invention is depicted, and includes a digital micromirror device (DMD) 2 as spatial light modulator, an LED light source set 3, a pick-up section 4, an image processor 5, a paper exposure section 6 and a controller 7.

Figure 2:
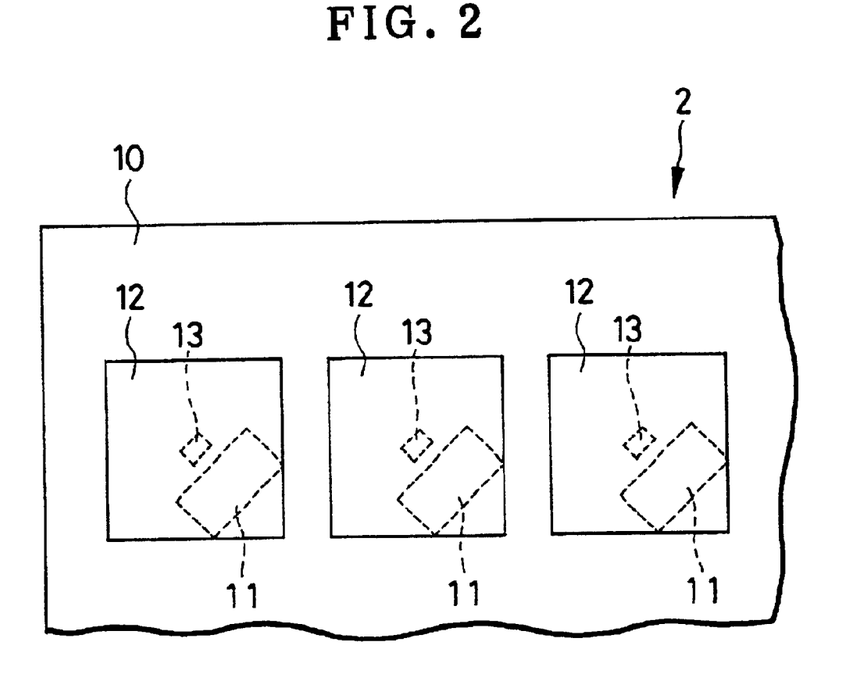
FIG. 2 is an explanatory view in plan, illustrating micromirrors in a digital micromirror device.

In FIG. 2, a construction of the digital micromirror device 2 is illustrated. The digital micromirror device 2 includes static RAM (SRAM) 10, micromirrors 12 and posts 13. The static RAM 10 is constituted by a great number of memory cells 11 arranged in a matrix form. The micromirrors 12 in a small size are disposed on respectively the memory cells 11, and supported by the posts 13 in a pivotally movable manner. The micromirrors 12 have a quadrilateral shape of which each side is 16 $\mu$m long, and are formed of thin film of metal with electrical conductivity, for example of aluminum or the like. The micromirrors 12 are tilted by electrostatic force generated between the micromirrors 12 and the memory cells 11. The memory cells 11, the micromirrors 12 and the posts 13 are produced by well-known integration techniques. In the present embodiment, the micromirrors 12 in the digital micromirror device 2 is disposed in a matrix form of m×n for light emission of one frame in order to expose photosensitive material frame by frame.

Figure 3:
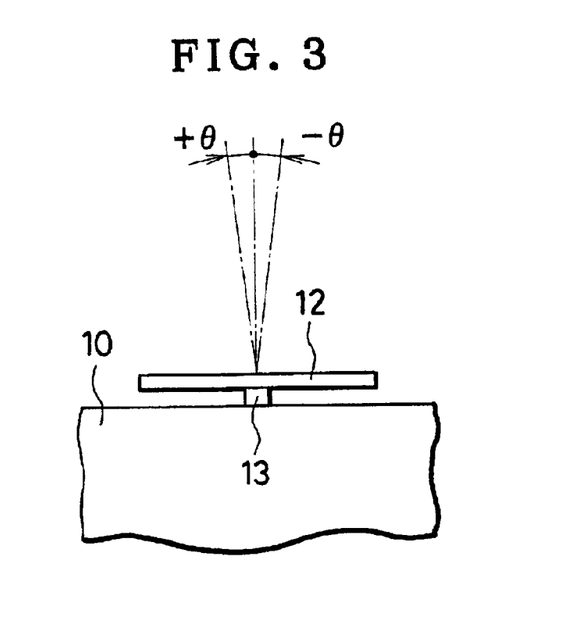
FIG. 3 is a side elevation illustrating each micromirror.

In FIG. 3, the micromirrors 12 are oriented horizontally while the power source is turned off. When mirror drive data of 0 is written to the memory cells 11 in the static RAM 10, the micromirrors 12 are tilted by the angle of $-\theta$. When mirror drive data of 1 is written to the memory cells 11, the micromirrors 12 are tilted by the angle of $+\theta$. Thus, a range in which the micromirrors 12 are tilted according to the mirror drive data is $2\theta$.

In FIG. 1, when the micromirrors 12 are in a first position tilted by the angle of $-\theta$, photo film 16 in the pick-up section 4 receives light reflected by the micromirrors 12 upon the incidence of the light from the LED light source set 3. When the micromirrors 12 are in a second position tilted by the angle of $+\theta$, color photographic paper 15 as photosensitive material in the paper exposure section 6 receives light reflected by the micromirrors 12 upon the incidence of the light from the LED light source set 3.

In FIG. 1, the LED light source set 3 illuminates the digital micromirror device 2. The LED light source set 3 is constituted by a red LED light source 20, a green LED light source 21, a blue LED light source 22, first and second dichroic mirrors 23 and 24, a condenser lens 25 and a light balancing filter 26. The red LED light source 20 includes a great number of red light-emitting diodes disposed in a matrix form on a circuit board, and emits red light in a manner of the frame exposure. The green and blue LED light sources 21 and 22 include respectively green and blue light-emitting diodes, and are constructed in a similar manner to the red LED light source 20. An LED driver 27 drives the LED light sources 20–22 selectively at the time of both picking up and exposure.

The first dichroic mirror 23 allows red light from the red LED light source 20 to pass, and reflects green light. The second dichroic mirror 24 allows the red light and the green light from the green LED light source 21 to pass, and reflects blue light. The condenser lens 25 condenses light from all the LED light sources 20–22, and applies the light to the whole surface of the digital micromirror device 2. The light balancing filter 26 compensates for shading of the light transmitted through the same, and suppresses occurrence of unevenness of the light amount.

The LED driver 27 is controlled by the controller 7, and causes the LED light sources 20–22 to emit light at the time of picking up and exposure. Light amounts of red, green and blue light and balances between those are different according to types of the photo film 16 and characteristics of the photographic paper 15. Light emitting conditions according to which the LED light sources 20–22 are driven are determined by the control of those with the LED driver 27.

The paper exposure section 6 includes a black shutter 30, a printing projecting lens 31 as printing projecting optical system, and paper feeder rollers 32 as photosensitive material feeder. The black shutter 30 includes an openable shutter plate, and shut at the time of picking up the photo film 16, and opened at the time of exposing the photographic paper 15. While the photo film 16 is picked up, the black shutter 30 intercepts the light from a position of the micromirrors 12, which are set in the second position. This prevents fogging of the photographic paper 15 in the pick-up operation. The printing projecting lens 31 focuses light on a photosensitive surface of the photographic paper 15 upon receiving the light from the micromirrors 12 set in the second position. The paper feeder rollers 32 are rotated by a paper feeder motor 33, and feed the photographic paper 15 one frame after another. The paper feeder motor 33 is driven by a motor driver 34 controlled by the controller 7. A paper processor 35 is provided with the photographic paper 15 exposed in the paper exposure section 6, and develops the photographic paper 15 for processing. Also, there is a paper mask mechanism 36.

The pick-up section 4 is constituted by an anti-reflection shutter 37, a photo film carrier 38, a pick-up lens 39 as pick-up optical system, and an image area sensor 40. The anti-reflection shutter 37 includes an openable shutter plate, and opened at the time of picking up the photo film 16, and shut at the time of exposing the photographic paper 15. The anti-reflection shutter 37 shields the inside of the printer body from ambient light incident upon a surface of the photo film carrier 38. A surface of the anti-reflection shutter 37 opposed to the digital micromirror device 2 is coated with light absorbing material such as black coloring material. The light absorbing material absorbs unwanted light from the micromirrors 12 set in the first position during exposure to the photographic paper 15. Thus, the photographic paper 15 is prevented from being exposed by scattered light.

The photo film carrier 38 is a mechanism well-known in the art, and supports the photo film 16 and sets each frame in a pick-up position, and is provided with a photo film feeder 64 having rollers, a photo film mask mechanism, a photo film feeder motor and the like. Those elements are controlled by the controller 7. The pick-up lens 39 focuses each frame with an image in the photo film 16 on to a surface of the image area sensor 40, the frame being illuminated by the light reflected by the digital micromirror device 2.

The image area sensor 40 is a charge coupled device (CCD) of a single plate type, and picks up an image recorded in the photo film 16 set in the photo film carrier 38. At the time of picking up, the LED light sources 20–22 in the LED light source set 3 are serially driven, to illuminate an image in the photo film by red, green and blue light. The image is picked up in three-color frame-sequential manner. Pick-up signals are obtained, and sent sequentially to a signal processor 41.

The signal processor 41 includes a correlated double sampling circuit (CDS), darkness correction circuit, and brightness correction circuit. The correlated double sampling circuit (CDS) samples feed through data and pixel data, the feed through data representing a level of a feed through signal, the pixel data representing a level of a pixel signal. For each of the pixels, the feed through data is subtracted from the pixel data. A result of the subtraction is the pixel data exactly corresponding to an amount of stored charge in each of CCD cells. The darkness correction circuit previously obtains a darkness output level for each of the CCD cells, and effects compensation for the darkness by subtraction of the darkness output level from image data. The brightness correction circuit previously obtains a gain for each of the CCD cells to compensate for the photoelectric converting characteristic, and corrects the image data according to the gain.

Figure 4:
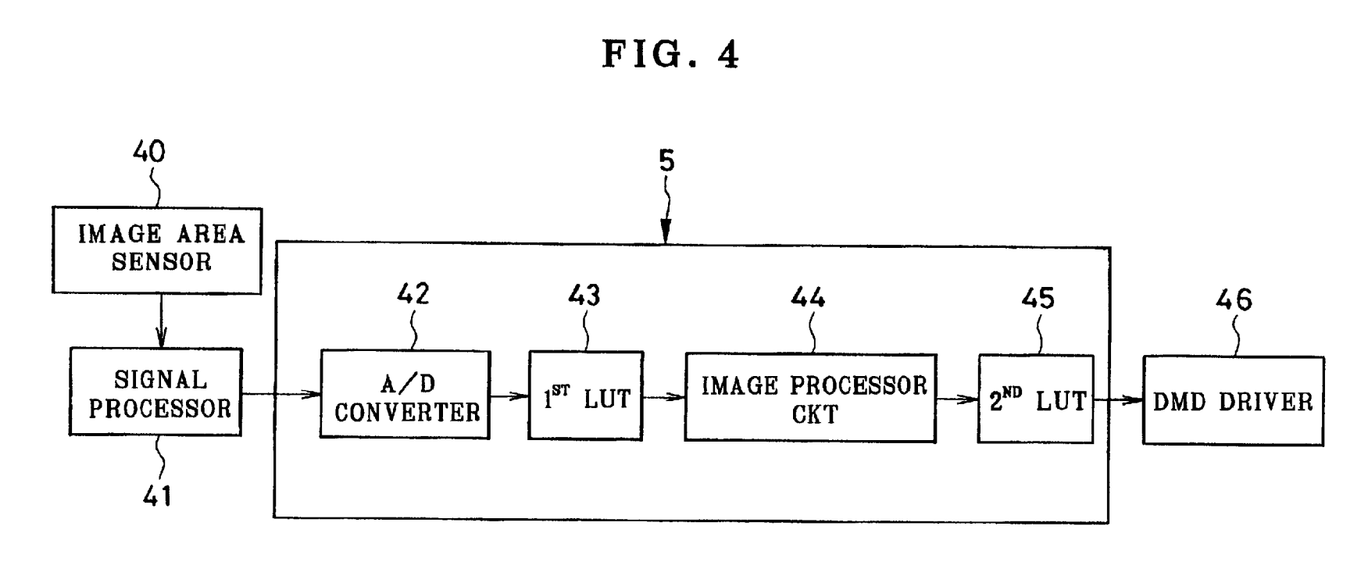
FIG. 4 is a block diagram schematically illustrating a pick-up section with an image processor.

In FIG. 4, the image processor 5 is constituted by an A/D converter 42, a first look-up table memory 43, an image processor circuit 44 and a second look-up table memory 45. The A/D converter 42 digitalizes the pick-up data from the signal processor 41. The first look-up table memory 43 is referred to for negative/positive conversion and conversion of density. The negative/positive conversion makes it possible for the image processor circuit 44 to process the image on the basis of the positive image. The density conversion makes it possible for the image processor circuit 44 to effect calculation in a linear region.

The image processor circuit 44 processes the image according to the known image processing. The image processing includes gray balance adjustment, gradation correction, density adjustment (brightness adjustment), light source type adjustment, image chroma adjustment (image color adjustment). The light source type adjustment and image chroma adjustment (image color adjustment) are based on operation with a matrix. Furthermore, the image processor circuit 44 effects electronic zooming processing, filtered printing processing (compression/extension of the dynamic range of density), and sharpening processing. Those steps of the processing are effected according to a low-pass filter, an adder, an LUT, a matrix operation unit and the like, and also on the basis of averaging processing and interpolating operation by use of combinations of those elements.

The second look-up table memory 45 is referred to for positive/negative conversion and light amount conversion. In exposure of an image to the photographic paper 15, the image is treated in the negative form. The density data of the image is converted into light amount data in an initial manner. A DMD driver 46 is supplied with the light amount data. The DMD driver 46 controls the micromirrors 12 according to the light amount data, and prints an image in the photo film 16 to the photographic paper 15.

In FIG. 1, the controller 7 is constituted by a well-known microcomputer, and provided with a keyboard 47 and a monitor display panel 48 such as a liquid crystal display panel. The controller 7 controls light of the three colors sequentially, and picks up and exposes frames of the photo film. Light amounts and a balance of the three-color light required for the LED light source set 3 at the time of pick-up and exposure are different between types of the photo film 16 and the photographic paper 15. Thus, the controller 7 conditions operation of the LED light sources 20–22 by means of the LED driver 27 according to each of the types of the photo film 16 and the photographic paper 15.

If the photo film 16 is a negative photo film, its support or photo film base has an orangish color. This means that the negative photo film is an orange mask itself. Transmission of green and blue light is through the photo film 16 is low, so that green and blue light is attenuated considerably in comparison with red light. Accordingly, the image area sensor 40 detects weakened green and blue light. The S/N ratio at the image area sensor 40 for green and blue light is very low. In consideration of this, the LED light source set 3 is controlled to emit green and blue light at higher light amounts than that for red light to pick up the photo film 16. In contrast to the green and blue light, red light is attenuated only at a small extent. The S/N ratio at the image area sensor 40 for red light is sufficiently high. There is no need of increasing a light amount for red light. It is to be additionally noted that, in order to determine conditions of emitting light, sensitivity of the image area sensor 40 for ranges of the wavelength should also be considered.

If the photo film 16 is a positive photo film, it has a colorless transparent support or photo film base without the orangish color. Thus, the light emitting distribution is determined only according to sensitivity of the image area sensor 40 in picking up an image in the positive photo film. The LED light sources 20–22 are driven to apply white light to the photo film 16, because substantially no difference exists between the three colors.

The photographic paper 15 has red, green and blue color sensitivities among which the blue color sensitivity is the highest and the red color sensitivity is the lowest. If red is desired to be recorded at the same density as green and blue, a light amount for red should be the highest. To set the exposure time equal between the three colors in exposure, the LED light sources 20–22 are driven to determine a red light amount higher than a green light amount and determine a blue light amount lower than the green light amount.

In general, it is preferable that light amounts of the three colors for printing should be considerably high for the purpose of raising efficiency of printing. Consequently, light amounts for picking up the photo film image can be smaller than those for printing.

Figure 5:
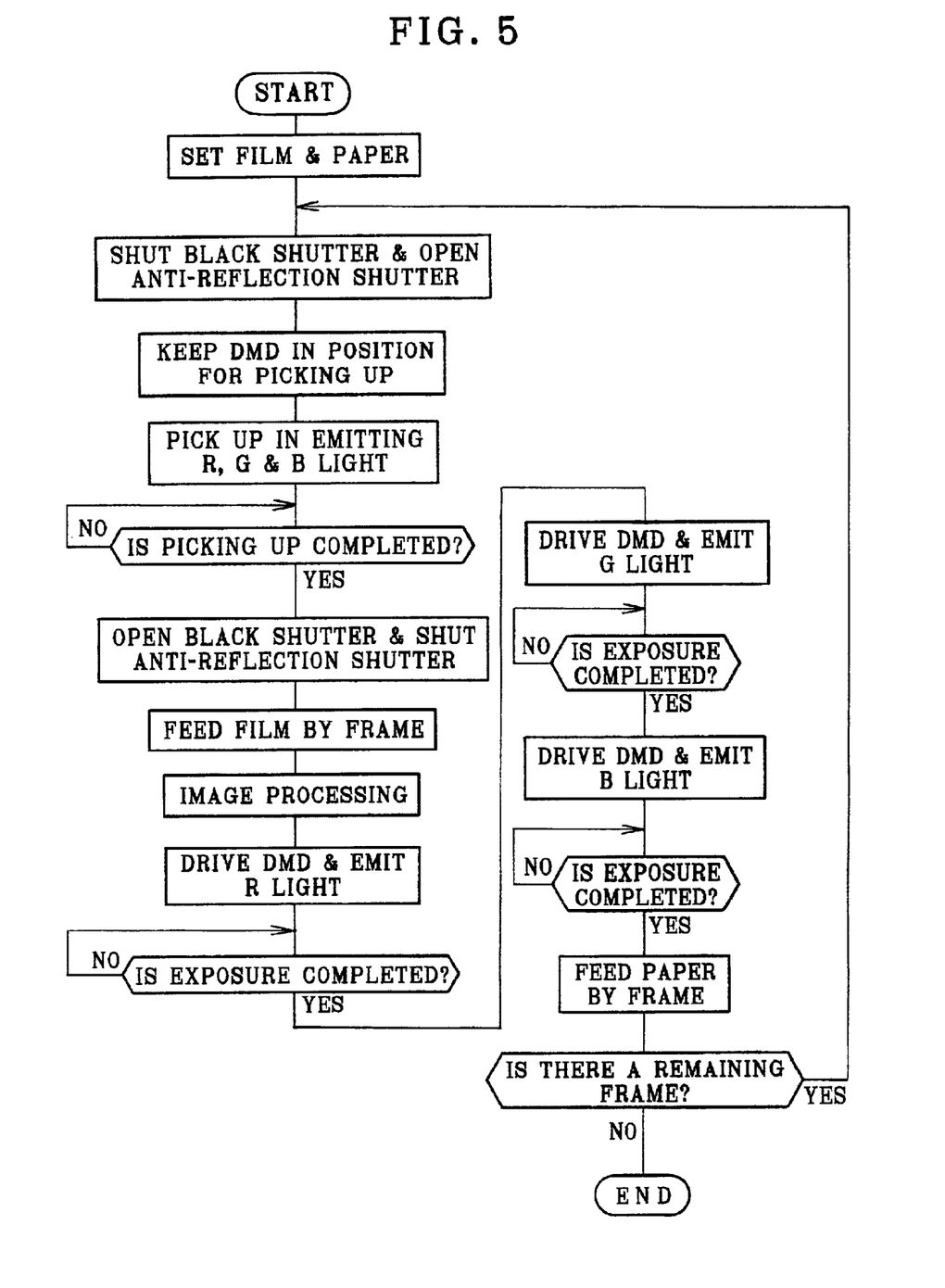
FIG. 5 is a flow chart illustrating operation of the printer.

The operation of the embodiment is described with reference to FIG. 5. At first, a command signal for printing is input. The controller 7 operates to set an image of the photo film 16 in a pick-up position in the photo film carrier 38. Also, the photographic paper 15 being unexposed is set in the exposure position. The black shutter 30 in the paper exposure section 6 is shut. At the same time, the anti-reflection shutter 37 is opened in the LED light source set 3. All the micromirrors 12 in the digital micromirror device 2 are driven and set in the first position. Then the red LED light source 20 is driven and emits red light, which is reflected by the digital micromirror device 2 to the pick-up section 4, and illuminates the image of the photo film 16 in the photo film carrier 38. The signal processor 41 retrieves an output from the image area sensor 40, and supplies the image processor 5 with red image data of the photo film 16.

When picking up of a red image is completed, the green LED light source 21 is driven to illuminate a frame of the photo film 16 in the photo film carrier 38 with green light. The image area sensor 40 picks up the photo film 16 being illuminated, for the signal processor 41 to generate green color image data. Similarly, the blue LED light source 22 is driven for picking up, so as to obtain blue color image data. After the three-color image data are obtained, the black shutter 30 is opened. At the same time, the anti-reflection shutter 37 is shut. The photo film feeder 64 at the photo film carrier 38 feeds the photo film 16 by one frame, to set a succeeding frame in the pick-up position.

In the image processor 5, the A/D converter 42 digitalizes the image data. The first look-up table memory 43 subjects the image data to the negative/positive conversion and density conversion. For example, the negative photo film in which a red image is recorded has a form in which portions associated with the red image have a cyan color. In the present embodiment, image data of the full scale is 255. Image data of those red image portions are retrieved as R=0, G=255, B=255 upon the pick-up. The image data is converted by the first look-up table memory 43 for the negative/positive conversion into image data of R=255, G=0, B=0. According to the image data, a simulated image is indicated in the monitor display panel 48. The same red image portions are indicated in the red color. The image data after the negative/positive conversion and density conversion is subjected to the image processing by the image processor circuit 44. Then in the second look-up table memory 45, the image data is converted according to the positive/negative conversion into density data, which is converted to light amount data. According to the light amount data, the micromirrors 12 in the digital micromirror device 2 are individually controlled to effect three-color frame-sequential exposure.

In the three-color frame-sequential exposure, the red LED light source 20 is turned on at first, and emits red light to the digital micromirror device 2. Selected ones among the micromirrors 12 corresponding to pixels for recording red are set in the second position, and reflects the red light toward the photographic paper 15. The selected micromirrors 12, when exposure time according to the light amount data has elapsed, are shifted from the second position to the first position, to complete the exposure.

An image being red at the time of photographing operation in a camera is treated as R=255, G=0, B=0 in the image processing. This is converted to data R=0, G=255, B=255 after the positive/negative conversion. Three-color light is applied to the photographic paper 15 at light amounts corresponding to those data, to develop the magenta color complementary to the green and develop the yellow complementary to the blue. Thus, the red color is recorded.

When the red color exposure has been completed for all the pixels, then the green LED light source 21 is turned on to emit green light to the digital micromirror device 2. A green color exposure is taken in a manner similar to the red color exposure. Upon completion of the green color exposure, the blue LED light source 22 is turned on to take a blue color exposure. The three-color frame-sequential exposure being completed, the photographic paper 15 is fed by the paper feeder rollers 32 by one frame. Frames are picked up one after another. According to pick-up data of the frames, the LED light sources 20–22 and the digital micromirror device 2 are driven for full-color printing. The photographic paper 15 after being exposed is fed into the paper processor 35, and developed and dried.

Figure 6:
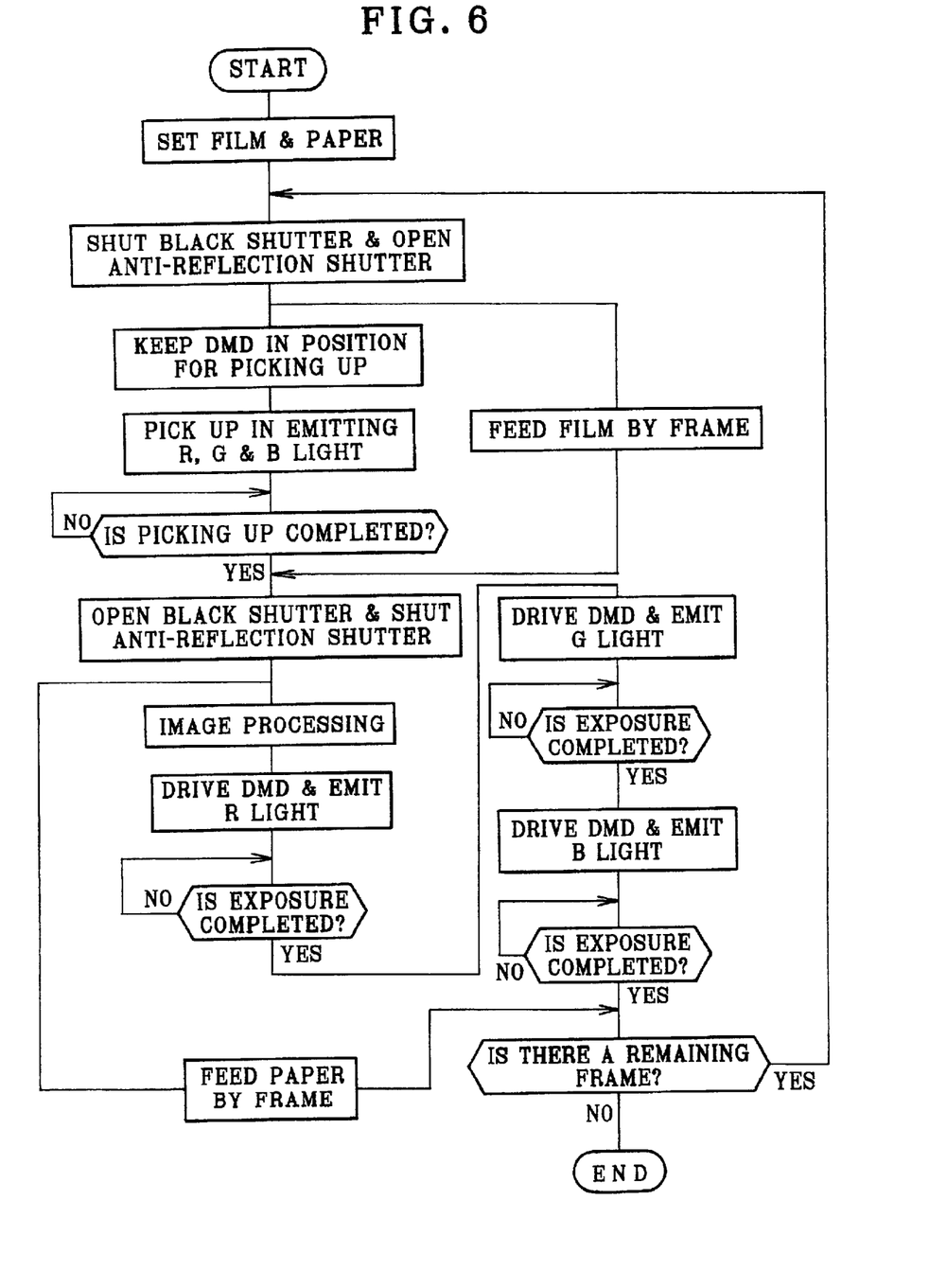
FIG. 6 is a flow chart illustrating operation of another preferred printer in which processing time is shortened.

In the above embodiment, the pick-up operation is immediately after the photographic paper 15 is fed by one frame. The exposing operation is immediately after the photo film 16 is fed by one frame. Consequently, the flow with those processes is very efficient and requires only a short time. In FIG. 6, another preferred embodiment is depicted, in which the photo film 16 is fed by one frame during the pick-up operation, and the photographic paper 15 is fed by one frame during the exposing operation. This is effective in shortening the processing time in a further manner.

In the above embodiments, the micromirrors 12 are arranged in the matrix form to correspond to one frame. Alternatively, a region covered by the digital micromirror device 2 may be a part of one frame. Such a part can be defined by dividing each frame in the photo film feeding direction. For such a construction, picking up and exposure are repeated for plurality of times to pick up and expose one frame. Furthermore, the digital micromirror device 2 may have only one array of the micromirrors 12. Picking up and exposure are repeated one line after another for pick up and expose one frame.

In the above embodiments, the paper exposure section 6 has the black shutter 30. The pick-up section 4 has the anti-reflection shutter 37. However, the black shutter 30 and the anti-reflection shutter 37 may be eliminated from the printer if unwanted light is kept from reaching the photographic paper 15 by alternately driving the digital micromirror device 2 and the LED light sources 20–22.

In the above embodiments, the LED light source set 3 includes the LED light sources 20–22 for each of the colors. However, a white light source may be used. Also, color filters can be used to be selectively settable between the white light source and the DMD to obtain red, green and blue light. In the course of picking up the photo film, no filters are inserted. White light is emitted while an image is picked up by an image area sensor of three colors. In the course of exposing the photographic paper, the three filters are selectively set between the white light source and the DMD for three-color frame-sequential exposure.

Also, the image area sensor 40 may a three-plate type of CCD. With this type, the red LED light source 20, the green LED light source 21 and the blue LED light source 22 are driven simultaneously to pick up the three colors. Thus, the pick-up can be efficiently effected.

Note that a process of synthesizing images may be added to the above embodiment. The image being picked up is indicated on a display panel. An additional image, template image or letters or phrases may be combined with the principal image to edit a synthesized image, which may be printed on the photographic paper. In the above embodiment, the printer is a full-color type. However, the printer of the present invention may be monochromatic.

Figure 7:
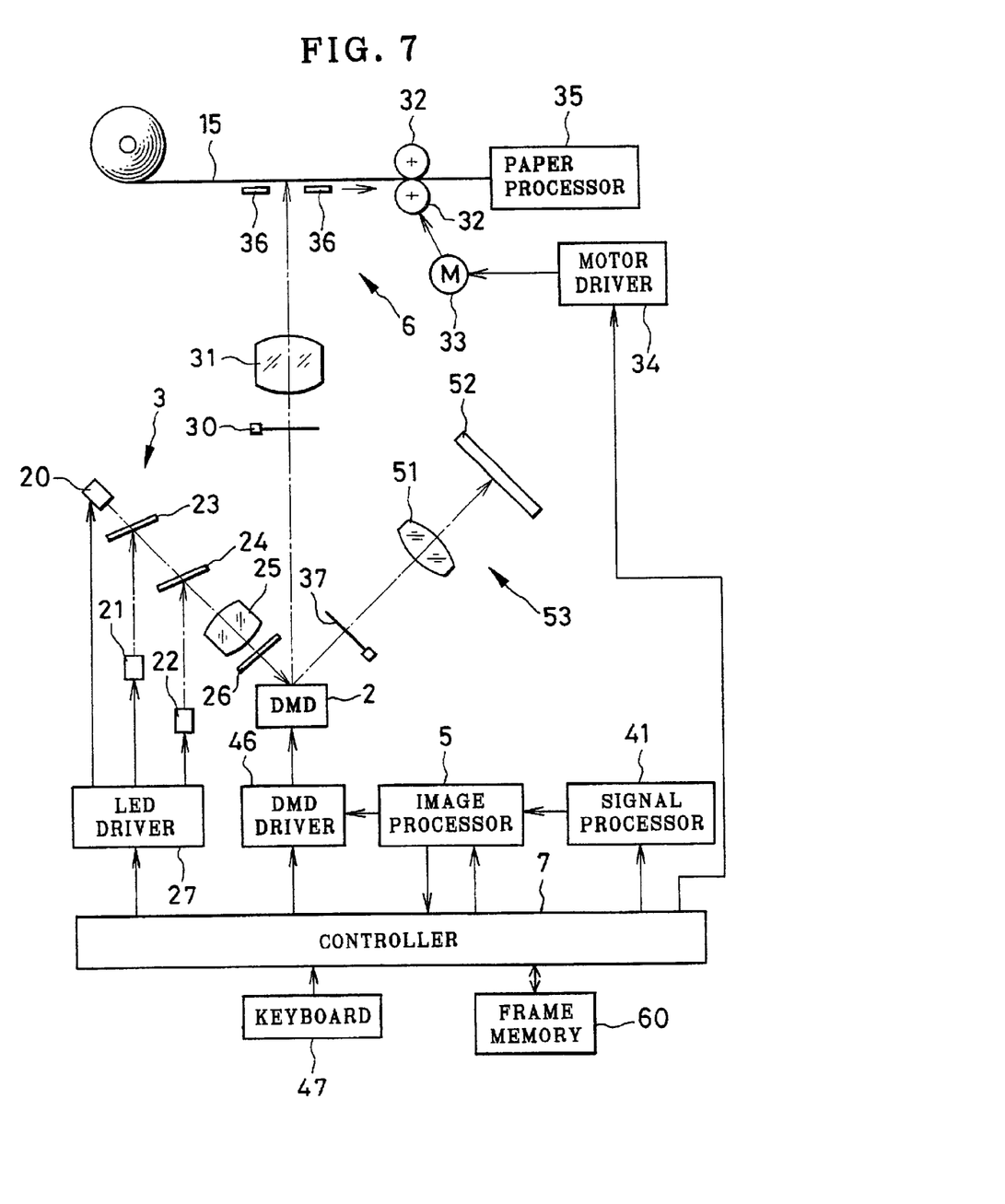
FIG. 7 is a block diagram schematically illustrating a color printer having an indicator for simulation and including a digital micromirror device.

In the above embodiment, the image is printed according to image data obtained by picking up the image in the photo film. Furthermore, the image to be printed may be indicated in a simulated form. Elements similar to those of the above embodiment are designated with identical reference numerals. In FIG. 7, a printer is provided with an indicator section 53, which includes an indicator screen 52 of a translucent sheet or film, and an indicating projecting lens 51 as indicating projecting optical system. In the digital micromirror device 2, the micromirrors 12 are in the matrix form of m×n. When image data is input to the printer by an external operation, the controller 7 shuts the black shutter 30, and opens the anti-reflection shutter 37. According to the image data, the micromirrors 12 in the digital micromirror device 2 are tilted between the first and second positions. Light is reflected by the digital micromirror device 2 and projected on to the indicator screen 52 by means of the indicating projecting lens 51. Therefore, the image of the photographic paper 15 can be observed and checked before printing. After the checking, the controller 7 shuts the anti-reflection shutter 37 and opens the black shutter 30 to expose the image on to the photographic paper 15. It is further to be noted that a memory card storing image data can be used as frame memory 60, and can be set on a memory card reader. The image can be indicated on to the indicator screen 52 according to the image data retrieved from the frame memory 60, and observed for checking.

It is noted that the indicator section 53 may be operated later than the paper exposure section 6 is operated. Thus, an exposure can be taken at first, and then the image can be indicated and checked for confirmation.

Note that the indicator screen 52 is adapted to projection of the image on an inner surface reverse to an outer surface which is externally observed by a user. Consequently, the digital micromirror device 2 can be driven for the image indication according to such drive data as to project the image on the inner face in an inverted manner.

Also, the indicator section 53 is a full-color indicator. At the time of indication, the digital micromirror device 2 and the LED light sources 20–22 are driven cyclically for the three colors at a very short period, so that a full-color image can be observable by means of afterimage.

Furthermore, a liquid crystal display panel may be disposed in the position of the indicator screen 52, and may be caused by the controller 7 to indicate an image. In the digital micromirror device 2, all the micromirrors 12 can be set in the first position to illuminate the inside of the indicator screen 52 in a manner of back light.

Figure 8:
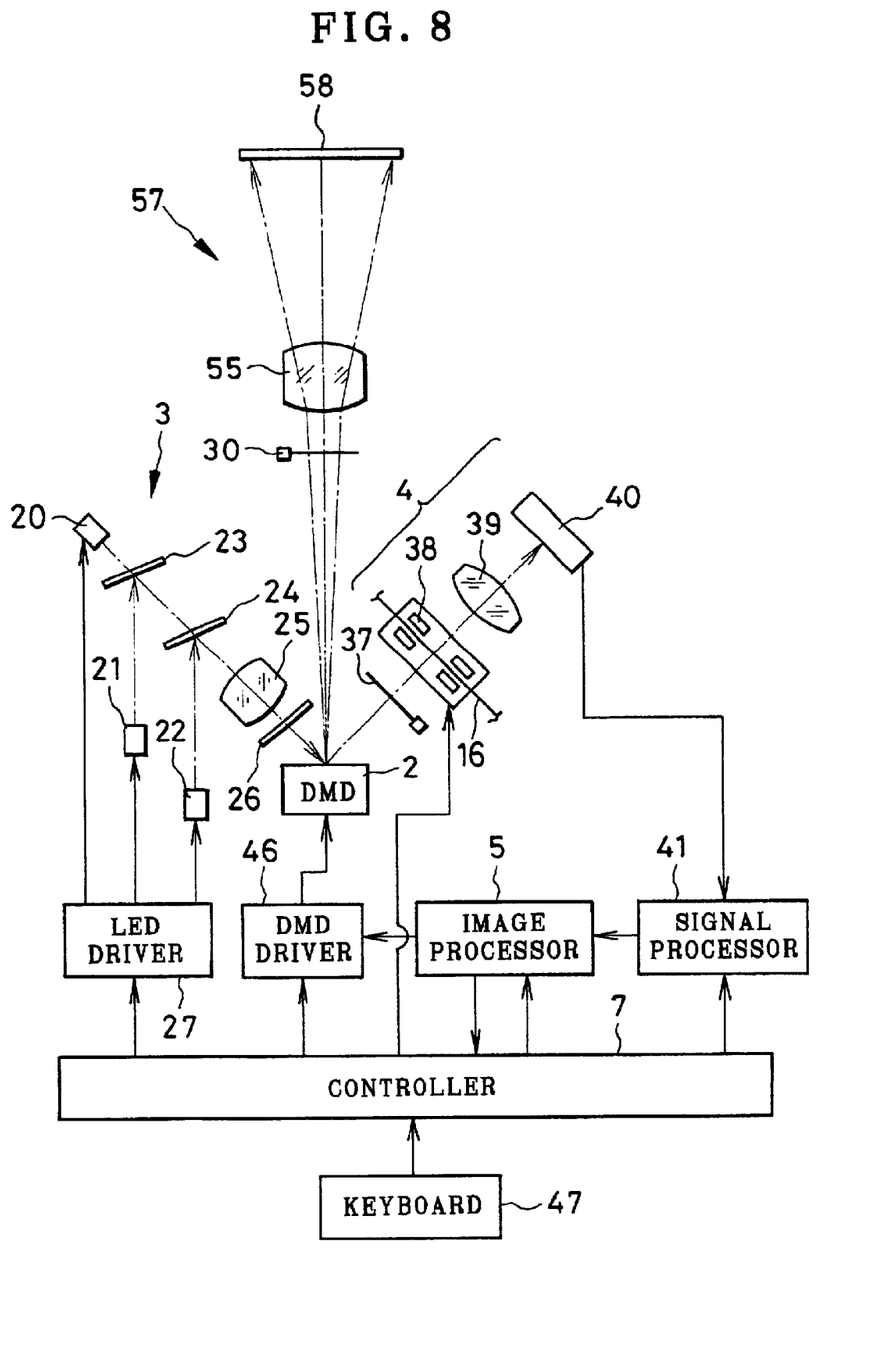
FIG. 8 is a block diagram schematically illustrating a projector including a digital micromirror device.

Instead of the printer of the above embodiments, the present invention is applicable to a projector in which an image is projected according to image data obtained by picking up the image in the photo film. Elements similar to those of the above embodiment are designated with identical reference numerals. In FIG. 8, the projector includes a projector section 57 instead of the paper exposure section 6. The projector section 57 has a projecting lens 55 as projecting optical system. In the digital micromirror device 2, the micromirrors 12 are in the matrix form of m×n. At first, the controller 7 shuts the black shutter 30 and opens the anti-reflection shutter 37 at the same time. An image in the photo film set in the photo film carrier 38 is read by the pick-up section 4. In projecting the image, the black shutter 30 is opened and the anti-reflection shutter 37 is shut. An external screen 58 is used for projection of the image according to the data from the pick-up section 4. It is to be noted that reading and projection of images may be effected one frame after another. Also, all the images on the photo film can be read at first, before necessitated images selected from all the images may be projected. Similarly, reading and projecting operation can be modified as desired by a user, or predetermined as preset patterns.

Also, the projector section 57 is a full-color projector. At the time of projection, the digital micromirror device 2 and the LED light sources 20–22 are driven cyclically for the three colors at a very short period, so that a full-color projected image can be observable by means of afterimage.

Also, the printer of FIG. 7 and the projector of FIG. 8 may be monochromatic.

Furthermore, the spatial light modulator in the present invention may be an piezoelectric driving type of micromirror device (AMA) or the like.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A printer comprising:
   at least one light source for generating light;
   a spatial light modulator, disposed in a traveling path of said light, including plural micromirrors, arranged in a plurality of arrays, and individually shiftable between first and second positions different in a direction;
   a pick-up section, disposed in a traveling path of said light reflected by said plural micromirrors in said first position, for picking up a picture image in photo film illuminated by said light, to output image data, wherein said pick-up section includes an image area sensor;
   a printing projecting optical system, disposed in a traveling path of said light reflected by said plural micromirrors in said second position, for focusing and recording a print image to photosensitive material;
   a controller for control in a pick-up mode and a printing mode;

a pick-up optical system for focusing said light on said pick-up section upon being passed through said picture image in said photo film;

a photo film feeder, actuated after operation of said pick-up section, for feeding said photo film by one frame of said picture image; and a photosensitive material feeder, actuated after recording of said printing projecting optical system, for feeding said photosensitive material by one frame of said print image;

wherein:
when in said pick-up mode, said controller sets said plural micromirrors in said first position, to illuminate said picture image in said photo film, and operates said pick-up section to obtain said image data;
when in said printing mode, said controller selectively sets said plural micromirrors in said second position according to said image data, for recording of said print image with said printing projecting optical system;
said plural micromirrors are disposed in a matrix form corresponding to a frame shape; and
said controller controls said at least one light source in different conditions between said pick-up mode and said printing mode.

2. A printer as defined in claim 1, wherein said photosensitive material is color photographic paper;
said at least one light source is first, second and third light sources, driven selectively, for generating respectively red, green and blue light, to expose said photosensitive material.

3. A printer as defined in claim 2, wherein said controller controls said first, second and third light sources in conditions different therebetween.

4. A printer comprising:
at least one light source for generating light;
a spatial light modulator, disposed in a traveling path of said light, including plural micromirrors arranged in a matrix form, and individually shiftable between first and second positions different in a direction;
an externally observable indicator screen;
an indicating projecting optical system, disposed in a traveling path of said light reflected by said plural micromirrors in said first position, for projecting an image to said indicator screen;
a printing projecting optical system, disposed in a traveling path of said light reflected by said plural micromirrors in said second position, for focusing and recording an image to photosensitive material;
a controller for control in a simulating mode and a printing mode;
wherein
when in said simulating mode, said controller selectively sets said plural micromirrors in said first position according to image data, for indication of a simulated image according to said image data with said indicating projecting optical system;
when in said printing mode, said controller selectively sets said plural micromirrors in said second position according to said image data, for recording of a print image according to said image data with said printing projecting optical system.

5. A printer as defined in claim 4, wherein said controller controls said at least one light source in different conditions between said simulating mode and said printing mode.

6. A printer as defined in claim 5, wherein
said indicator screen includes a screen plate through which at least part of light incident thereon is transmissible, and which has a screen inner face and a screen outer face;
said controller, when in said simulating mode, determines micromirrors among said plural micromirrors to be set in said first position so as to project said simulating image in an inverted manner to said screen inner face.

7. A printer as defined in claim 6, wherein
said photosensitive material is color photographic paper;
said at least one light source is first, second and third light sources, driven selectively, for generating respectively red, green and blue light, to expose said photosensitive material.

8. A printer as defined in claim 7, wherein said controller controls said first, second and third light sources in conditions different therebetween.

9. A projector comprising:
at least one light source for generating light;
a spatial light modulator, disposed in a traveling path of said light, including plural micromirrors arranged in a matrix form, and individually shiftable between first and second positions different in a direction;
a pick-up section, disposed in a traveling path of said light reflected by said plural micromirrors in said first position, for picking up a picture image in photo film illuminated by said light, to output image data;
a projecting optical system, disposed in a traveling path of said light reflected by said plural micromirrors in said second position, for focusing a projected image on a projecting position;
a controller for control in a pick-up mode and a projecting mode; and
a pick-up optical system for focusing light on said pick-up section upon being passed through said picture image in said photo film;
wherein:
when in said pick-up mode, said controller sets said plural micromirrors in said first position, to illuminate said picture image in said photo film, and operates said pick-up section to obtain said image data;
when in said protecting mode, said controller selectively sets said plural micromirrors in said second position according to said image data, for projection of said projected image with said projecting optical system; and
said controller controls said at least one light source in different conditions between said pick-up mode and said projecting mode.

10. A projector as defined in claim 9, wherein said at least one light source is first, second and third lightsources, driven selectively, for generating respectively red, green and blue light.

11. A projector as defined in claim 10, wherein said controller controls said first, second and third light sources in conditions different therebetween.

* * * * *